(12) United States Patent  (10) Patent No.: US 7,477,341 B2
Lee et al.  (45) Date of Patent: Jan. 13, 2009

(54) LIQUID CRYSTAL PANEL AND METHOD OF EXPOSING THE SAME

(75) Inventors: Su-Woong Lee, Gumi-si (KR); Joo-Yeon Yun, Busan (KR); Sang-Yoon Paik, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/870,972

(22) Filed: Jun. 21, 2004

(65) Prior Publication Data

US 2004/0263768 A1  Dec. 30, 2004

(30) Foreign Application Priority Data

Jun. 30, 2003  (KR) ............... 10-2003-0043972

(51) Int. Cl.
*G02F 1/133* (2006.01)
(52) U.S. Cl. ........................................ 349/73
(58) Field of Classification Search ............ 349/73
See application file for complete search history.

(56) References Cited

U.S. PATENT DOCUMENTS 4,906,071 A * 3/1990 Takahara et al. ............ 349/73
5,668,650 A * 9/1997 Mori et al. ................. 349/42
6,870,594 B1 * 3/2005 Zhang ...................... 349/187
2003/0231277 A1 * 12/2003 Zhang ...................... 349/187

FOREIGN PATENT DOCUMENTS

| JP | 53-013938 | 2/1978 |
| JP | 55-015173 | 2/1980 |
| JP | 60-003609 | 1/1985 |
| JP | 09-265062 | 10/1997 |
| JP | 10-107289 | 4/1998 |
| JP | 11-044878 | 2/1999 |
| JP | 11-052583 | 2/1999 |

OTHER PUBLICATIONS

Office Action issued by the Japanese Patent Office on Jun. 26, 2006 (w/ English Translation).

* cited by examiner

*Primary Examiner*—David Nelms
*Assistant Examiner*—Phu Vu
(74) *Attorney, Agent, or Firm*—McKenna Long & Aldridge LLP

(57) ABSTRACT

A base substrate includes a first liquid crystal display (LCD) panel and a second LCD panel on the base substrate, wherein the second LCD panel contacts the first LCD panel.

3 Claims, 8 Drawing Sheets

LIQUID CRYSTAL PANEL AND METHOD OF EXPOSING THE SAME

This application claims the benefit of Korean Patent Application No. 2003-43972, filed on Jun. 30, 2003, which is hereby incorporated by reference for all purposes as if fully set forth herein.

BACKGROUND OF THE INVENTION

1. Field of the Invention

The present invention generally relates to liquid crystal display (LCD) devices. More particularly, the present invention relates to an efficient arrangement of LCD panels on a base substrate and a method of exposing the same.

2. Discussion of the Related Art

Generally, LCD devices are formed using LCD panels. A plurality of LCD panels can be fabricated on a base substrate upon performing thin film patterning processes (e.g., exposing, developing, cleaning, photolithography, and etching processes) and alignment film processes (e.g., coating and rubbing processes). After being fabricated, individual LCD panels may be separated from the base substrate by a scribing process.

FIG. 1 illustrates a plurality of LCD panels arranged on a base substrate.

Referring to FIG. 1, a plurality of LCD panels 110 having a uniform size are regularly arranged, and spaced apart from each other at uniform distances, on the base substrate 100.

FIG. 2 illustrates two LCD panels arranged on a portion of the base substrate shown in FIG. 1.

Referring to FIG. 2, alignment marks 120 are arranged at a periphery of each LCD panel 110 and are used to align the LCD panels 110 with apparatuses capable of performing the thin film patterning processes outlined above. For example, in performing the aforementioned exposing process, each LCD panel 110 must be aligned with a mask of a scan-type exposing apparatus (not shown). Proper alignment during the exposing process is critical because thin film patterns formed on the LCD panels 110 are extremely fine and any misalignment between the LCD panels 110 and the exposing device prevents the desired patterns from being formed. Accordingly, alignment marks 120 ensure proper alignment between the mask of the exposing apparatus and the LCD panels 110.

Still referring to FIG. 2, first and second scribe lines 130a and 130b, respectively, are arranged adjacent to opposing edges of first and second LCD panels 110a and 110b, respectively. Although not shown, scribe lines are also formed to individually surround the first and second LCD panels 110a and 110b. Accordingly, the first and second scribe lines 130a and 130b facilitate separation of LCD panels 110 from on the base substrate 100. It should be noted that the portion of the base substrate 100 between the first and second scribe lines 130a and 130b is not considered part of either LCD panel 110; the first and second scribe lines 130a and 130b define portions of the base substrate 100 that constitute the outermost edge of each LCD panel 110. As such, the distance by which adjacent LCD panels 110 are spaced apart from each other on the base substrate 100 is determined by the distance between the first and second scribe lines 130a and 130b. To separate the LCD panels 110 from the base substrate, a scribing apparatus (not shown) is sequentially applied to the first and second scribe lines 130a and 130b (in addition to other scribe lines surrounding the LCD panel). After the LCD panels 110 are separated from the base substrate 100, the LCD panels 110 may be further processed to complete fabrication of individual LCD devices.

Because the LCD panels 110 arranged on the base substrate 100 shown in FIG. 1 all have a uniform size, the efficiency with which the base substrate 100 is used is minimal. That is, the percentage of the base substrate 100 actually occupied by the LCD panels 110 is minimal due to the space between the first and second scribe lines 130a and 130b. While the efficiency with which the base substrate 100 may be used could be increased by providing the LCD panels 110 with varying sizes, such a result is difficult to achieve because the LCD panels 110 must be spaced apart from each other at uniform distances between adjacent scribe lines. Because the LCD panels 110 must be the same size, and because the space between adjacent scribe lines 130a and 130b must be uniform, the LCD panels 110 cannot be arranged irregularly on the base substrate 100. Therefore, the related art arrangement of LCD panels makes inefficient use of the base substrate 100.

Furthermore, because individual LCD panels 110 are separated from each other on the base substrate 100, alignment marks 120 and scribe lines must be provided for each LCD panel 110. Accordingly, alignment and scribing processes must be performed for each individual LCD panel 110, thereby increasing the processing time required to fabricate a plurality of LCD devices. As the number of LCD panels 110 formed on the base substrate 100 increases, the number of scribing processes increase, along with the rate of degradation in components forming the scribing apparatus (e.g., scribing wheel).

SUMMARY OF THE INVENTION

Accordingly, the present invention is directed to an efficient arrangement of LCD panels on a base substrate and a method of exposing the same that substantially obviates one or more of the problem due to limitation and disadvantages of the related art.

An advantage of the present invention provides a highly efficient arrangement of LCD panels on a base substrate.

Another advantage of the present invention provides a method of fabricating the LCD panels having a reduced scribing process time and reduced scribing wheel degradation.

Another advantage of the present invention provides a method of exposing the LCD panels on a base substrate.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a base substrate may, for example, include a first flat panel and a second flat panel, wherein the second flat panel contacts the first flat panel.

In accordance with principles of the present invention, a method of fabricating flat panels may, for example, include forming a first flat panel and a second flat panel such that they contact each other; and dividing the first and second LCD panels in a single separation process.

In accordance with principles of the present invention, a method of exposing a liquid flat may, for example, include exposing a first flat panel group having a plurality of flat panels, and a first periphery region arranged at a periphery of the first flat panel group; and exposing a second flat panel group having a plurality of flat panels, and a second periphery region arranged at a second periphery region of the second flat panel group, wherein the first flat panel group neighbors the second flat panel group, wherein the flat panels of each group contact each other, and wherein the first periphery region overlaps the second periphery region.

In one aspect of the present invention, the first flat panel may, for example, include an LCD panel.

In another aspect of the present invention, the second flat panel may, for example, include an LCD panel.

In still another aspect of the present invention, the first flat panel group may, for example, include a plurality of LCD panels.

In yet another aspect of the present invention, the second flat panel group may, for example, include a plurality of LCD panels.

In still a further aspect of the present invention, the separating process may, for example, include a scribing process.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used throughout the drawings to refer to the same or like parts.

Figure 3:
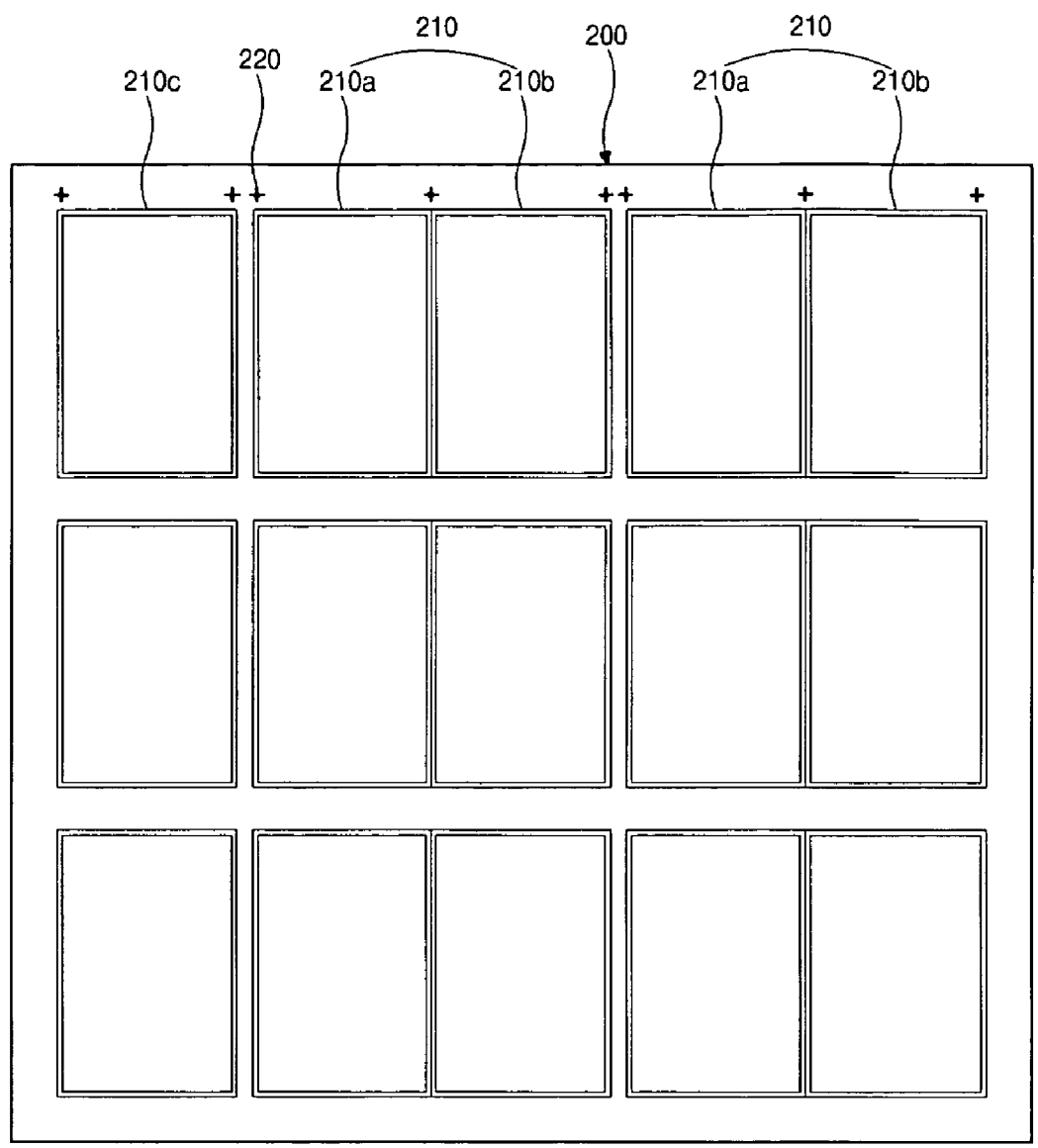
FIGS. 3 and 4 illustrate exemplary LCD panel arrangements according to principles of the present invention.
Figure 4:
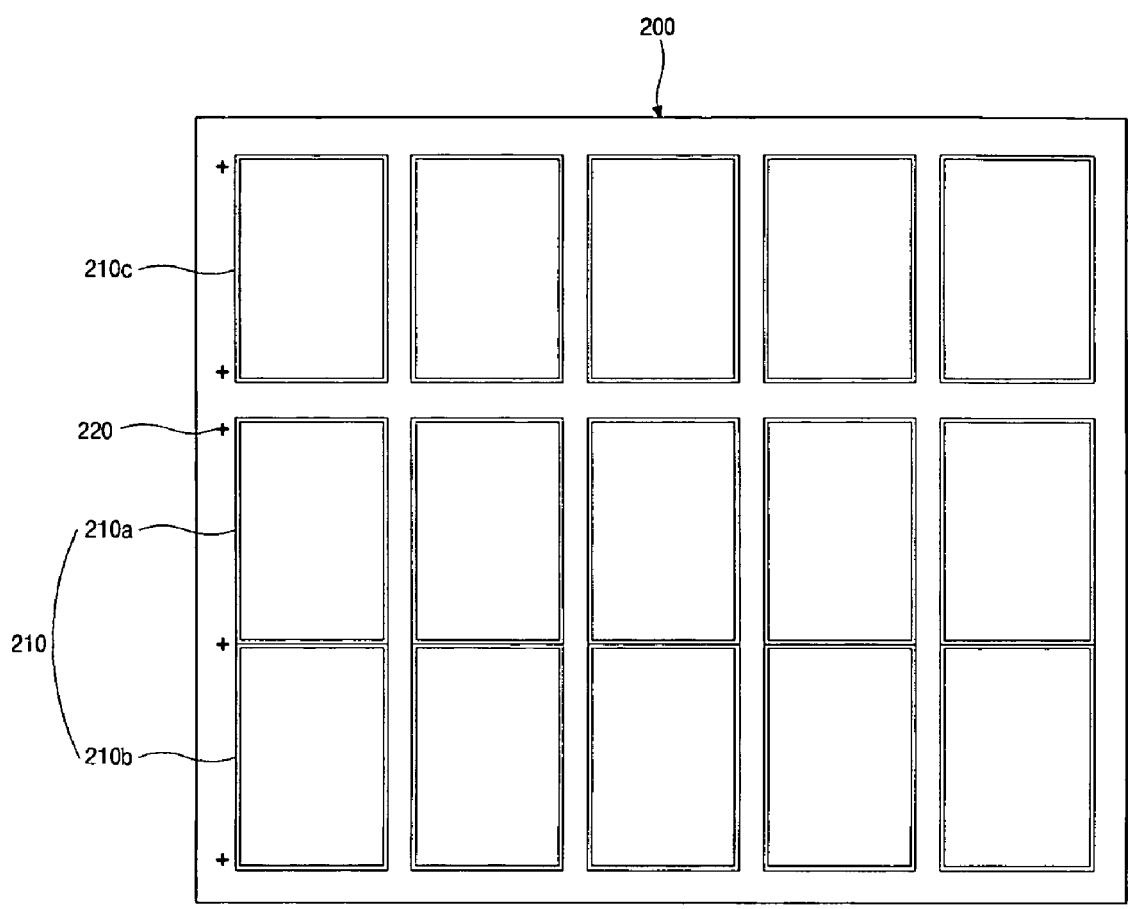

FIGS. 3 and 4 illustrate exemplary LCD panel arrangements according to principles of the present invention.

According to principles of the present invention, and while generally referring to FIGS. 3 and 4, a plurality of LCD panels may be arranged on the same base substrate 200 such that pairs of first and second LCD panels 210a and 210b, respectively, hereinafter referred to as LCD panel couples 210, share a common scribe line (not shown). Although not shown, scribe lines may also be formed to individually surround the LCD panel couples 210. Similar to the first and second scribe lines 130a and 130b shown in FIG. 1, the scribe line (not shown) between the first and second LCD panels 210a and 210b defines portions of the base substrate 200 that constitute the outermost edge of each LCD panel 210a and 210b. As such, the first and second LCD panels 210a and 210b essentially contact each other on the base substrate 200. To separate the LCD panels 210a and 210b, a scribing apparatus (not shown) may be applied to the scribing line in a single scribing process. By providing a plurality of LCD panel couples 210, the base substrate 200 can be used more efficiently than base substrates such as those illustrated in FIG. 1. Moreover, the same number of LCD panels may be separated from the base substrate 200 shown in FIG. 2 in a fewer number of steps as compared to the number of steps required to separate the LCD panels from the base substrate 100 shown in FIG. 1.

In one aspect of the present invention shown in FIG. 3, the first and second LCD panels 210a and 210b may be transversally adjacent to each other within their respective LCD panel couples 210, relative to an orientation of the base substrate 200. Accordingly, a scribe line dividing the first and second LCD panels 210a and 210b may be longitudinally arranged on the base substrate 200. In another aspect of the present invention shown in FIG. 4, the first and second LCD panels 210a and 210b may be longitudinally adjacent to each other within their respective LCD panel couples 210, relative to an orientation of the base substrate 200. Accordingly, a scribe line dividing the first and second LCD panels 210a and 210b may be transversally arranged on the base substrate 200.

According to principles of the present invention, the base substrate 200 may, for example, include a plurality of LCD panels arranged in a plurality of rows and columns. In one aspect of the present invention, predetermined pairs of transversally and/or longitudinally adjacent first and second LCD panels 210a and 210b on the base substrate 200 may form LCD panel couples 210. In another aspect of the present invention, third LCD panels 210c may be arranged on the base substrate 200 but not form a part of any LCD panel couple 210. It should be noted that FIGS. 3 and 4 merely illustrate exemplary arrangements of first to third LCD panels 210a-210c on a base substrate 200; it is appreciated that the first to third LCD panels 210a-210c may be arranged in substantially any manner desired.

Figure 1:
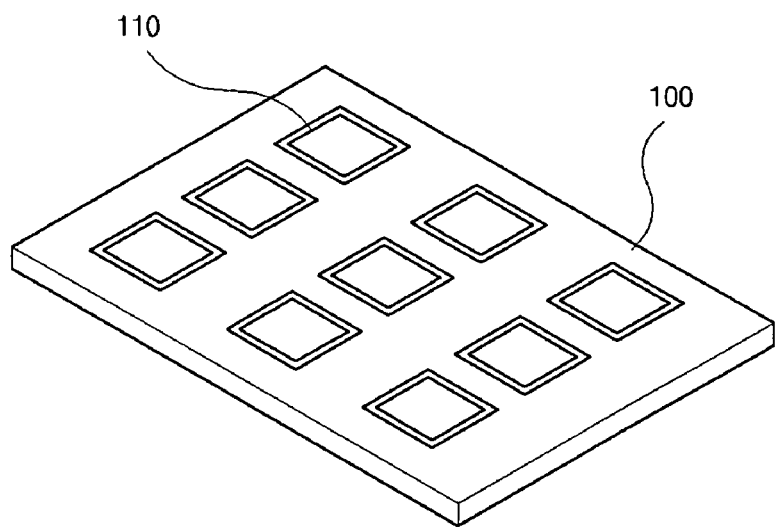
FIG. 1 illustrates a perspective view of a plurality of LCD panels arranged on a base substrate.
Figure 2:
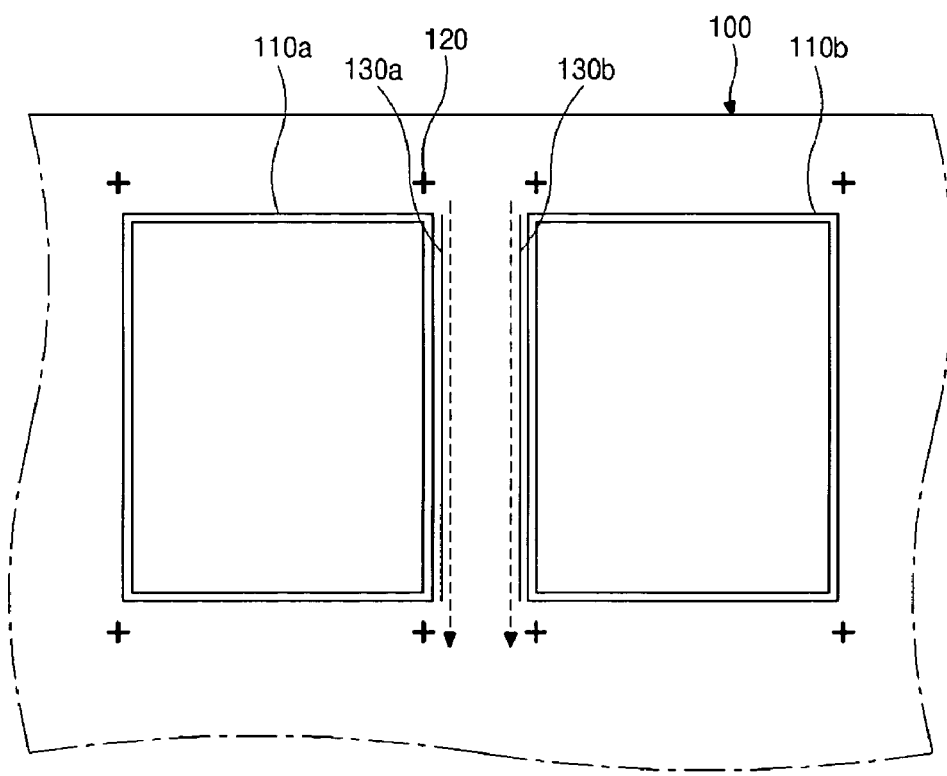
FIG. 2 illustrates alignment marks and scribe lines arranged in correspondence with the LCD panels shown in FIG. 1.

As illustrated above with respect to FIGS. 3 and 4, arranging adjacent ones of first and second LCD panels 210a and 210b into LCD panel couples 210 as shown in FIGS. 3 and 4 beneficially reduces the total number of scribe lines and alignment marks 220 required to fabricate and separate the LCD panels as compared with LCD panel arrangements such as those illustrated in FIG. 1. Accordingly, the efficiency with which the base substrate 200 is used may be increased along with the product yield of total LCD panels fabricated from the base substrate 200.

Figure 5:
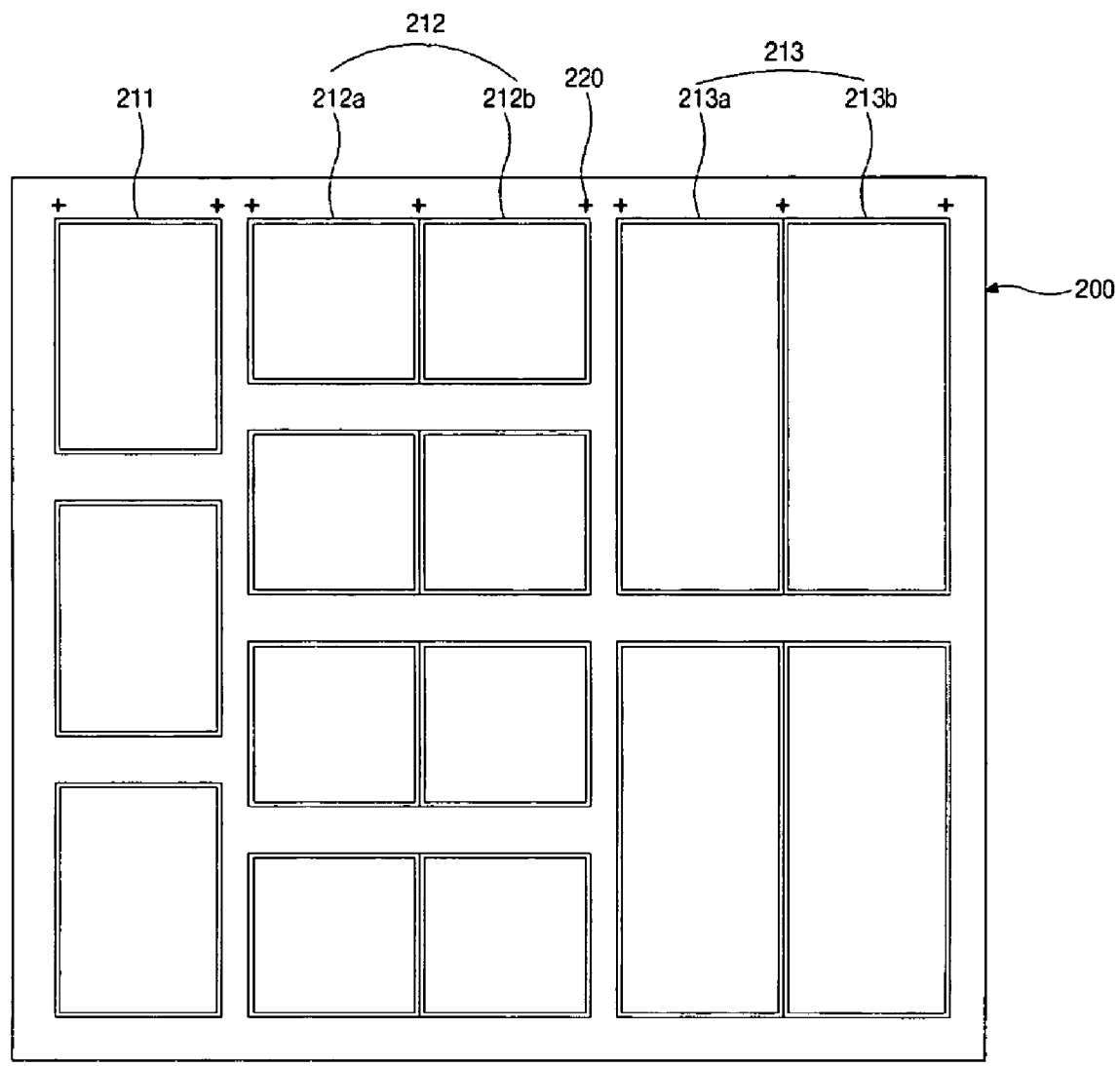
FIG. 5 illustrates an exemplary arrangement of LCD panels of varying sizes according to principles of the present invention.

FIG. 5 illustrates an exemplary arrangement of LCD panels of varying sizes according to principles of the present invention.

Referring to FIG. 5, a base substrate 200 may be used to form LCD panels of varying sizes. In one aspect of the present invention, the base substrate 200 may be used to form LCD panels 211 having a first size, LCD panels 212a and 212b having a second size, and LCD panels 213a and 213b having a third size, wherein the first, second, and third sizes are different from each other. In another aspect of the present invention, at least one pair of adjacent LCD panels 212a and 212b having the second size may be arranged into at least one first LCD panel couple 212. In yet another aspect of the present invention, at least one pair of adjacent LCD panels 213a and 213b having the third size may be arranged into at least one second LCD panel couple 213.

Similar to the arrangement of LCD panels illustrated in FIGS. 3 and 4, the arrangement of LCD panels in FIG. 5 increases the efficiency with which the base substrate 200 is used and the product yield of LCD panels fabricated from the same base substrate. Furthermore, because LCD panels of varying sizes may be formed on the same base substrate 200, the efficiency with which the base substrate 200 is used may be increased even more.

Figure 6:
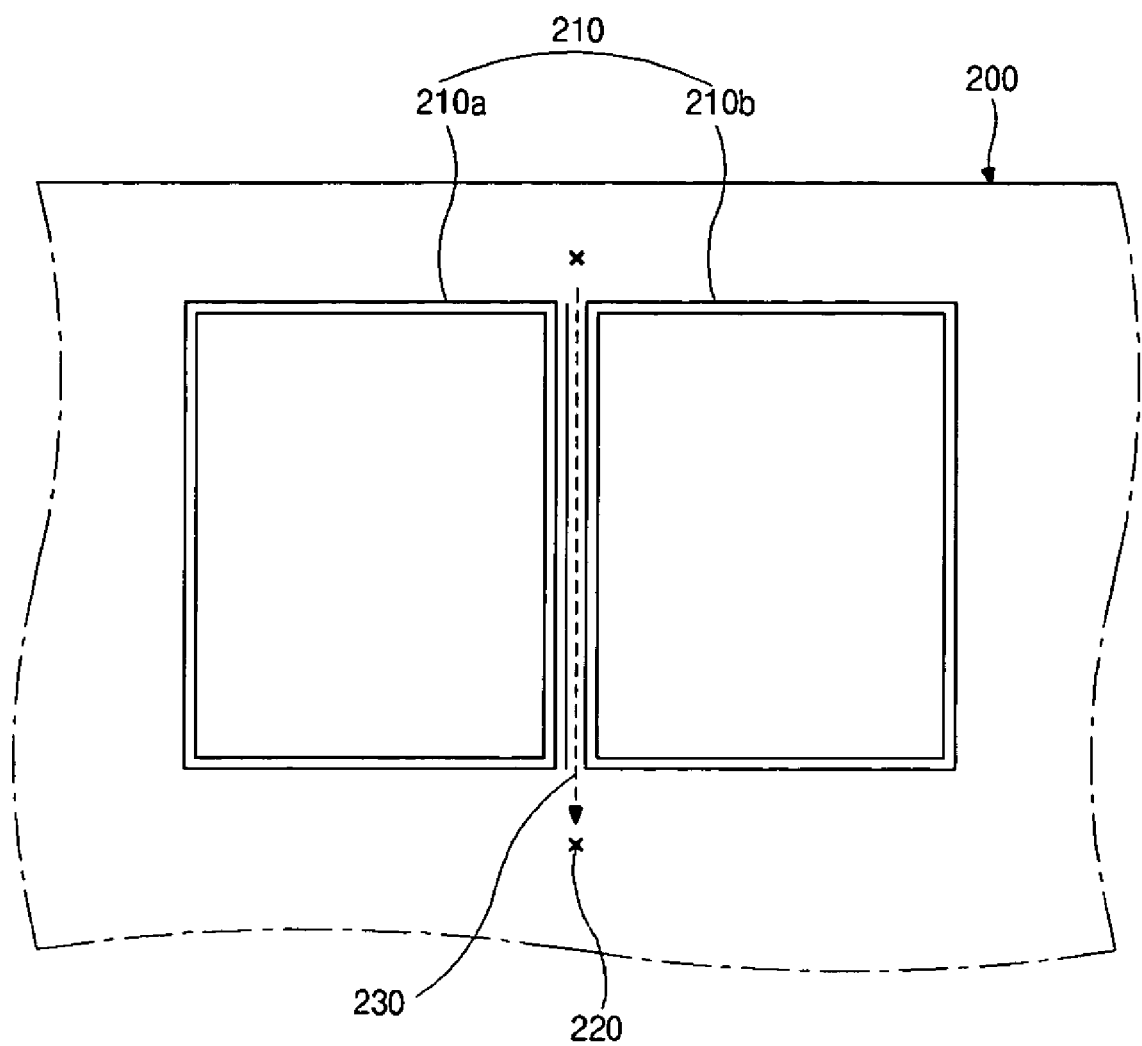
FIG. 6 illustrates an exemplary alignment mark and scribe line arrangement according to principles of the present invention.

FIG. 6 illustrates an exemplary alignment mark and scribe line arrangement according to principles of the present invention.

Referring to FIG. 6, first and second LCD panels 210a and 210b of LCD panel couple 210 may be divided by a single scribe line 230 and share the same alignment marks 220, which may be formed on the base substrate 200. As mentioned above, the scribe line 230 defines portions of the base substrate 200 that constitute the outermost edge of each LCD panel 210a and 210b. As such, the first and second LCD panels 210a and 210b essentially contact each other on the base substrate 200. Accordingly, first and second LCD panels 210a and 210b may be fabricated through a plurality of thin film patterning processes (e.g., exposing, developing, cleansing, photolithography, etching, etc.) and alignment film processes (e.g., coating, rubbing, etc.). After the aforementioned fabrication processes are complete, the first and second LCD panels 210a and 210b may be separated from each other during a scribing process wherein a scribing wheel of a scribing apparatus cuts portions of the base substrate 200 occupied by the scribe line 230. Upon completion of the single scribing process, the first and second LCD panels 210a and 210b are completely separated from each other within the LCD panel couple 210 and same number of LCD panels may be separated from the base substrate 200 in less time than the LCD panels 110 illustrated in FIGS. 1 and 2. Because the first and second LCD panels 210a and 210b may be separated from the base substrate 200 in a reduced number of scribing processes, the rate of degradation in components forming the scribing apparatus (e.g., a scribing wheel) is significantly reduced compared with rates of degradation experienced while separating LCD panels such as those illustrated in FIGS. 1 and 2.

Figure 7:
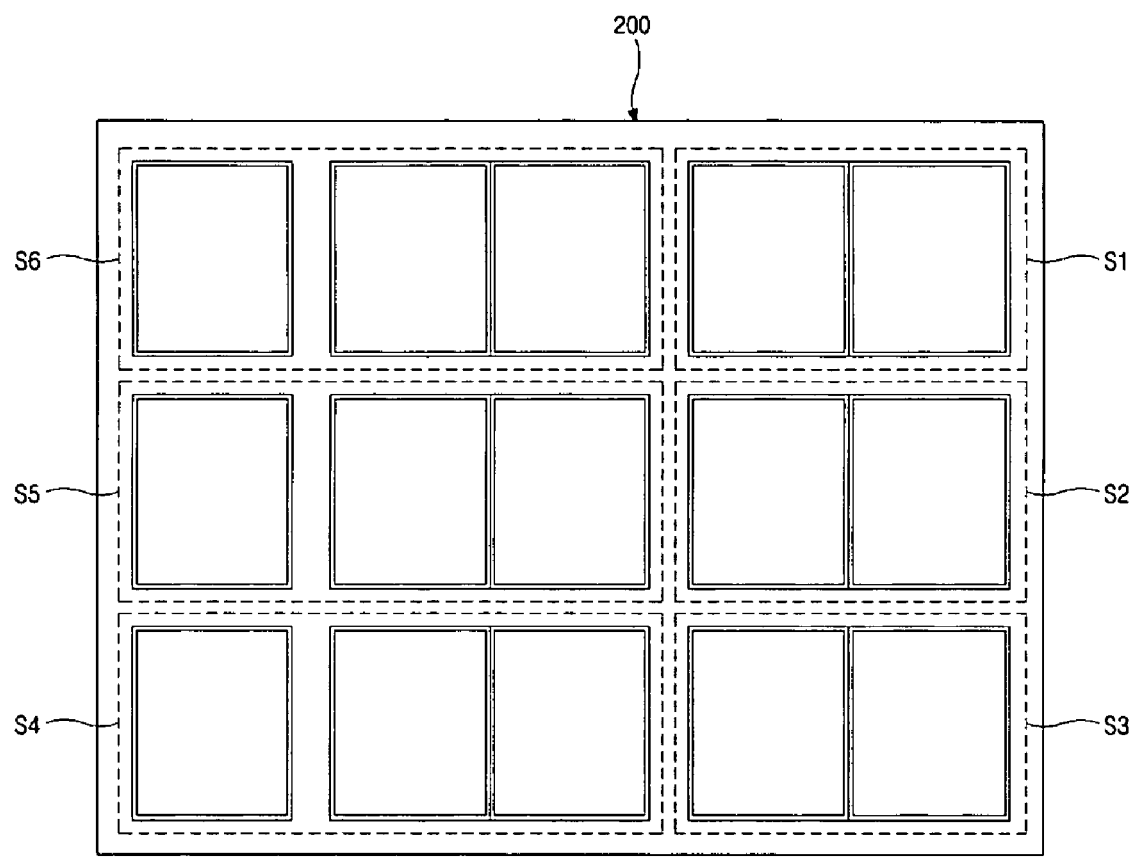
FIG. 7 illustrates exposing regions of the base substrate according to principles of the present invention.

FIG. 7 illustrates schematic view of exposing regions of the base substrate according to principles of the present invention.

Generally, it can be difficult to expose the entire base substrate 200 during a single exposing process such that each of the plurality of LCD panels are equally exposed. Therefore, and in accordance with principles of the present invention, the plurality of LCD panels may be grouped into a plurality of LCD panel groups, each of which may be individually exposed by a mask.

As shown in FIG. 7, each LCD panel on base substrate 200 may be exposed in an order determined by the region of the base substrate 200 in which it is formed. For example, region S1 may be exposed first, region S2 may be exposed second, region S3 may be exposed third, region S4 may be exposed fourth, region S5 may be exposed fifth, and region S6 may be exposed sixth. It will be appreciated, however, that the number, size, and arrangement of regions to be exposed may be varied as desired. Moreover, it will be appreciated that the order in which each region is exposed may be varied as desired.

In one aspect of the present invention, LCD panels within an LCD panel couple may be exposed by the same mask. In another aspect of the present invention, the size of the mask used in exposing the LCD panels may be determined in accordance with the largest exposing region. For example, the first to third exposing regions "S1" to "S3" and the forth to sixth exposing region "S4" to "S6" may be different sizes. In one aspect of the present invention, the forth to sixth exposing regions "S4" to "S6" may be larger than the first to third exposing regions "S1" to "S3". If only one mask is used during the exposing process, the mask used has a size corresponding to the forth to sixth exposing regions "S4" to "S6" and, when exposing the first to third exposing regions "S1" to "S3", a portion of the mask arranged over the forth to sixth exposing regions "S4" to "S6" must be shielded. If, upon exposing the first to third exposing regions "S1" to "S3", the portion of the mask arranged over the forth to sixth exposing regions "S4" to "S6" is not shielded, defective patterns may be formed within the forth and sixth exposing regions "S4" to "S6".

Figure 8A:
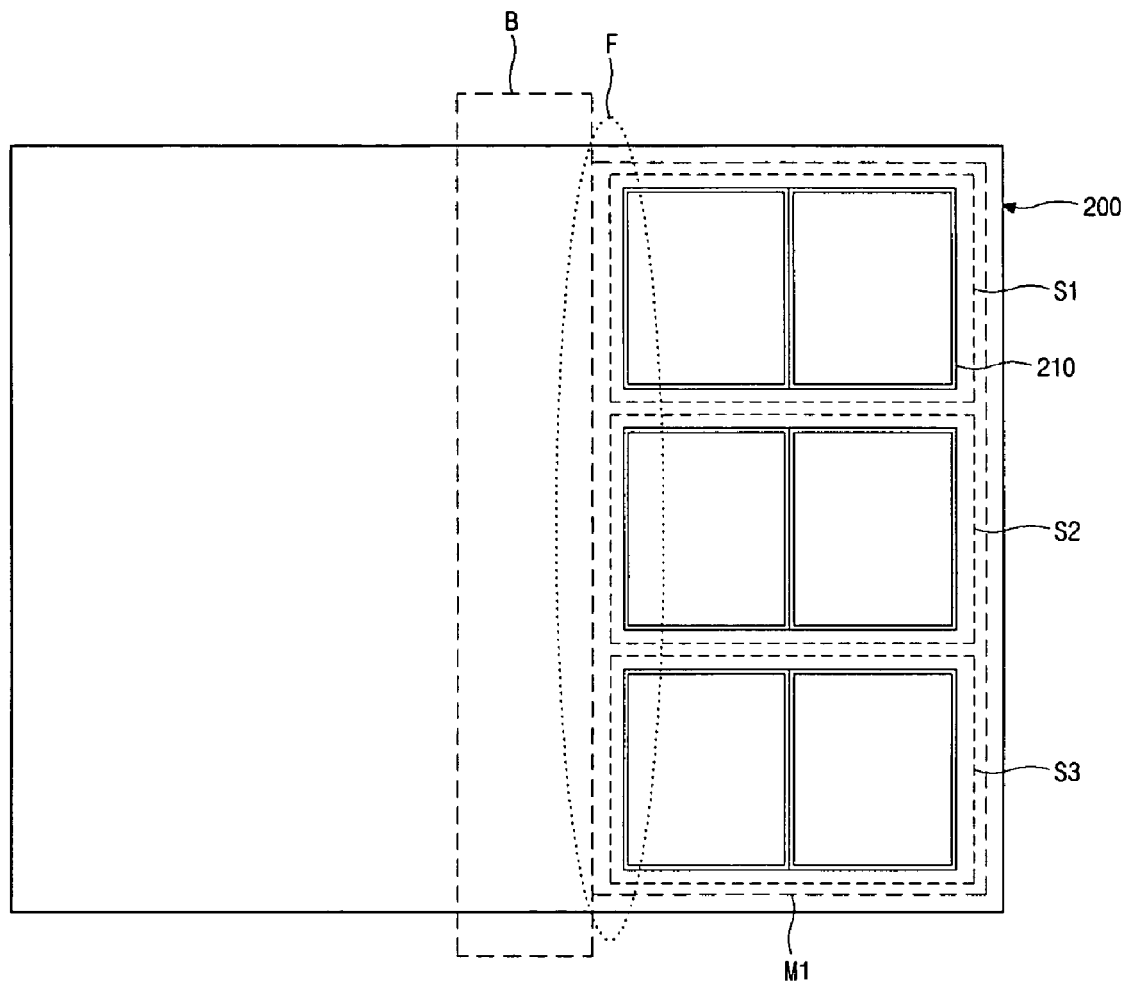
FIGS. 8A and 8B illustrate a method of exposing the LCD panels shown in FIG. 7.
Figure 8B:
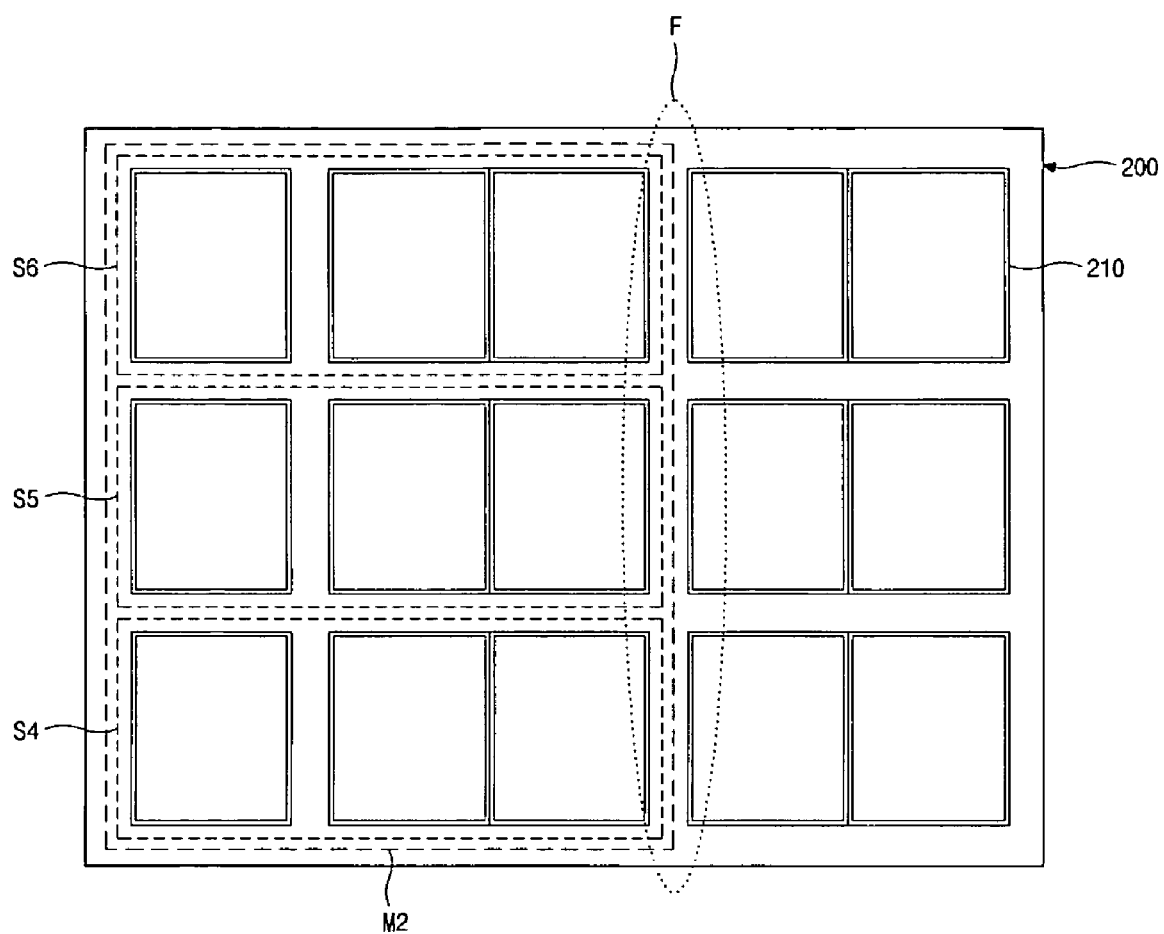

FIGS. 8A and 8B illustrate a method of exposing the LCD panels shown in FIG. 7.

Referring to FIG. 8A, thin film patterns may be fabricated by performing a first exposing process to the first to third exposing regions "S1" to "S3." Accordingly, the first to third exposing regions "S1" to "S3" may be exposed by an opening in a mask, wherein the opening has a first mask area "M1." In one aspect of the present invention, the first mask area "M1" may be defined by shielding means (e.g., blade "B") arranged on an end portion of the mask.

Referring to FIG. 8B, thin film patterns may be fabricated by performing a second exposing process on the forth to sixth exposing regions "S4" to "S6." Accordingly, the fourth to sixth exposing regions "S4" to "S6" may be exposed by an opening in the same mask used in the first exposing process, wherein the opening used to expose the fourth to sixth exposing regions "S4" to "S6" may have a second mask area "M2" larger than the first mask area "M1," due to the size of the forth to sixth exposing regions "S4" to "S6," however, no shielding means is necessary. Upon exposing the first to sixth exposing regions "S1" to "S6," the entire base substrate is exposed in two exposing processes.

Referring back to FIG. 8A, desired patterns may not be easily formed in a border region "F," adjacent to the shielding means and within the first mask area "M1," because the shielding means and base substrate 200 may uncontrollably shift relative to each other. Such an uncontrollable shift may cause the shielding means to be arranged within the first to third exposing regions "S1" to "S3" and prevent desired thin film patterns from being formed. Therefore, and in accordance with principles of the present invention, desired thin film patterns of LCD panels within the first to third exposing regions "S1" to "S3" may be formed via the first and second exposing processes. Moreover, and as similarly described above with respect to FIGS. 3, 4, and 5, the arrangement of LCD panels in FIGS. 8A and 8B increases the efficiency with which the base substrate 200 is used and the product yield of LCD panels fabricated from the same base substrate. In addition, the neighboring LCD panels "LP" can divide just one scribing process, according to process time of scribing and wheel consumption can be reduced.

As described above, the efficiency with which base substrates may be used may be maximized by forming LCD panels of various sizes and arrangements therein. By providing at least a portion of the LCD panels within LCD panel couples, the number of alignment marks and scribe lines, as well as the number of scribing processes, used to separate and fabricate the LCD panels into individual LCD devices is reduced relative to the related art LCD panel arrangement. Moreover, the degradation rate of the scribing apparatus may be reduced, along with the LCD panel fabrication time, as compared with the related art Lastly, desired patterns may be formed by exposing predetermined LCD panels to two exposing processes.

It will be apparent to those skilled in the art that various modifications and variation can be made in the present invention without departing from the spirit or scope of the invention. For example, it will be apparent that the principles of the present invention may be extended to the fabrication of any suitable device (e.g., flat panel display devices). Thus, it is intended that the present invention cover the modifications and variations of this invention provided they come within the scope of the appended claims and their equivalents.

What is claimed is:

1. A method of exposing a liquid crystal display (LCD) panel, comprising:

exposing a first LCD panel group having a plurality of LCD panels, and a first periphery region in a periphery of the first LCD group using a single mask; and exposing a second LCD panel group having a plurality of LCD panels, and a second periphery region in a periphery of the second LCD group adjacent to the first LCD panel group using the single mask, wherein at least two of the LCD panels of each LCD panel group essentially contact each other, wherein the first periphery region overlaps the second periphery region, and wherein the plurality of LCD panels includes a base substrate and a second substrate joined together.

2. The method according to claim 1, wherein the second LCD panel group is larger than the first LCD panel group.

3. The method according to claim 2, wherein a portion of the second LCD panel group is shielded by a shielding means when the first LCD panel group is exposed.

* * * * *